US011794347B2

(12) United States Patent
Bhattacharyya et al.

(10) Patent No.: US 11,794,347 B2
(45) Date of Patent: Oct. 24, 2023

(54) NAVIGATION OF TELE-ROBOT IN DYNAMIC ENVIRONMENT USING IN-SITU INTELLIGENCE

(71) Applicant: Tata Consultancy Services Limited, Mumbai (IN)

(72) Inventors: Abhijan Bhattacharyya, Kolkata (IN); Ruddra dev Roychoudhury, Kolkata (IN); Sanjana Sinha, Kolkata (IN); Sandika Biswas, Kolkata (IN); Ashis Sau, Kolkata (IN); Madhurima Ganguly, Kolkata (IN); Sayan Paul, Kolkata (IN); Brojeshwar Bhowmick, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 268 days.

(21) Appl. No.: 17/199,182

(22) Filed: Mar. 11, 2021

(65) Prior Publication Data
US 2022/0219325 A1    Jul. 14, 2022

(30) Foreign Application Priority Data
Jan. 8, 2021   (IN) .............................. 202121000976

(51) Int. Cl.
*B25J 9/16*   (2006.01)
*B25J 3/00*   (2006.01)
*B25J 13/08*  (2006.01)

(52) U.S. Cl.
CPC .............. *B25J 9/1689* (2013.01); *B25J 3/00* (2013.01); *B25J 9/161* (2013.01); *B25J 9/163* (2013.01);
(Continued)

(58) Field of Classification Search
CPC ... B25J 9/1689; B25J 3/00; B25J 9/161; B25J 9/163; B25J 9/1666; B25J 9/1697;
(Continued)

(56) References Cited

U.S. PATENT DOCUMENTS

| 11,016,491 B1 * | 5/2021 | Millard ................ G05D 1/0274 |
| 2019/0275676 A1 * | 9/2019 | Jensen ................... B25J 13/006 |

(Continued)

FOREIGN PATENT DOCUMENTS

CN          106060058 A     10/2016

OTHER PUBLICATIONS

Janson, Lucas, et al. "Fast Marching Tree: A Fast Marching Sampling-Based Method for Optimal Motion Planning in Many Dimensions." The International Journal of Robotics Research, vol. 34, No. 7, May 2015, pp. 883-921 (Year: 2015).*

(Continued)

*Primary Examiner* — Adam R Mott
*Assistant Examiner* — Matthew C Gammon
(74) *Attorney, Agent, or Firm* — FINNEGAN, HENDERSON, FARABOW, GARRETT & DUNNER LLP

(57) ABSTRACT

This disclosure relates generally to navigation of a tele-robot in dynamic environment using in-situ intelligence. Tele-robotics is the area of robotics concerned with the control of robots (tele-robots) in a remote environment from a distance. In reality the remote environment where the tele robot navigates may be dynamic in nature with unpredictable movements, making the navigation extremely challenging. The disclosure proposes an in-situ intelligent navigation of a tele-robot in a dynamic environment. The disclosed in-situ intelligence enables the tele-robot to understand the dynamic environment by identification and estimation of future location of objects based on a generating/training a motion (Continued)

model. Further the disclosed techniques also enable communication between a master and the tele-robot (whenever necessary) based on an application layer communication semantic.

7 Claims, 15 Drawing Sheets

(52) U.S. Cl.
CPC .......... *B25J 9/1666* (2013.01); *B25J 9/1697* (2013.01); *B25J 13/089* (2013.01)

(58) Field of Classification Search
CPC ......... B25J 13/089; G05B 2219/35472; G05B 2219/39212; G05B 2219/40174; G05D 2201/0211; G05D 1/0038; G05D 1/0274
See application file for complete search history.

(56) References Cited

U.S. PATENT DOCUMENTS

2019/0375102 A1* 12/2019 Wang ................. G06F 3/04847
2021/0150203 A1* 5/2021 Liu ...................... G06V 20/588

OTHER PUBLICATIONS

Chaplot, D. S., Gandhi, D., Gupta, S., Gupta, A., & Salakhutdinov, R. (2020). Learning to explore using active neural slam (Year: 2020).*

Martins, Renato et al., "Extending Maps with Semantic and Contextual Object Information for Robot Navigation: a Learning-Based Framework using Visual and Depth Cues", Computer Vision and Pattern Recognition, 2020, Arxiv, https://arxiv.org/pdf/2003.06336.pdf.

Narayana, Chittaranjan et al., "Object Detection and Tracking for Autonomous Navigation in Dynamic Environments", The International Journal of Robotics Research, 2010, SagePub, https://europa.informatik.uni-freiburg.de/files/ess-autonomousnavigation-ijrr01final.pdf.

Lorente, María-Teresa et al., "Model-based robocentric planning and navigation for dynamic environments", The International Journal of Robotics Research, 2018, vol. 37, SagePub, https://zaquan.unizar.es/record/74981/files/texto_completo.pdf.

* cited by examiner

NAVIGATION OF TELE-ROBOT IN DYNAMIC ENVIRONMENT USING IN-SITU INTELLIGENCE

CROSS-REFERENCE TO RELATED APPLICATIONS AND PRIORITY

The present application claims priority from Indian provisional application no. 202121000976, filed on Jan. 8, 2021.

TECHNICAL FIELD

The disclosure herein generally relates to navigation of a tele-robot, and, more particularly, to navigation of a tele-robot in dynamic environment using in-situ intelligence.

BACKGROUND

Tele-robotics is the area of robotics concerned with the control of robots from a distance, primarily using a wireless network/wireless communication such as Wi-Fi®, BLUETOOTH®, a deep space network, and similar or tethered connections. In tele-robotics, a user (a.k.a master) interacts with a robot (a.k.a_avatar or tele-robot) that is placed in a remote environment. The master and the tele-robot are connected over a public internet infrastructure, wherein the master sends commands to the tele-robot based on visual feedback from the tele-robot. Telepresence robots are being used in a wide variety of other applications ranging from medicine to toxic waste cleanup to art installations.

One of the major tasks for the master is to guide the tele-robot to navigate through a remote environment/geography. The navigation can happen either (a) in a manual mode, or (b) in an autonomous mode. The manual mode of navigation is tedious for the master as it needs frequent transmission of kinematic control information over a network which may not be efficient in terms of communication resource usage. Further in the autonomous mode of navigation there is an increased probability of service disruption due to loss of control commands because of transient impairments in the end-to-end channel. Hence a hybrid mode of communication is preferable. Further, in reality the remote environment where the tele robot navigates may be dynamic in nature as there may be unpredictable movements or positioning of objects obstructing the estimated trajectory that the tele-robotics might take to reach the end-destination. Hence for navigation in a dynamic environment, the tele-robot must be equipped with intelligence to understand the dynamic environment accurately despite the dynamic variance in the context while moving by not completely depending on the master's command.

SUMMARY

Embodiments of the present disclosure present technological improvements as solutions to one or more of the above-mentioned technical problems recognized by the inventors in conventional systems. For example, in one embodiment, a method for navigation of a tele-robot in dynamic environment using in-situ intelligence is provided. The method includes initiating a communication between the tele-robot and the master. The communication is based on an application layer communication semantic and associated with a plurality of modes of operation that includes a manual mode and an autonomous mode. The method further includes receiving the communication regarding the mode of operation at the tele-robot from the master and determining whether the plurality of modes of communication is a manual mode or an autonomous mode based on the application layer communication semantic and performing upon determining the plurality of modes of operation, one of a manual navigation of the tele-robot or in-situ intelligent navigation of the tele-robot. The method further includes performing in-situ intelligent navigation of the tele-robot, receiving a depth map of the dynamic environment from a plurality of sensors and a goal point from the master, wherein the plurality of objects comprises of a plurality of static objects, a plurality of interactive objects and a plurality of dynamic objects. Further method includes estimating a current position of the tele-robot based on a Simultaneous localization and mapping (SLAM) technique using a velocity associated with the tele-robot, wherein the velocity of the tele-robot is obtained using a plurality of sensors and the velocity includes an angular velocity and a linear velocity. The method further includes generating a geo-centric top view map from the depth map using the current position of the tele-robot based on a spatial transform (ST) technique, wherein the geo-centric top view map is a geo-centric representation comprising the current position of the tele-robot and the location details of the plurality of objects. The method further includes receiving a video feed of the dynamic environment at the tele-robot using the plurality of sensors, wherein the video feed is in RGB format. The method further includes identifying the plurality of interactive objects and the plurality of dynamic objects in the video feed based on an object detection technique. The method further includes estimating interactive object position or future position of the dynamic object. Finally method includes determining a navigation local policy for the tele-robot by passing the geo-centric map through a Fast Marching Motion Planner (FMMP) using the goal points, the current position of the tele-robot and the interactive object position/the future dynamic object position In another aspect, a system for navigation of a tele-robot in dynamic environment using in-situ intelligence is provided. The system includes a master and a tele-robot in dynamic environment in communication with each other. The communication is based on an application layer communication semantic and associated with a plurality of modes of operation that includes a manual mode and an autonomous mode. The system further includes one or more hardware processor configured for receiving the communication regarding the mode of operation at the tele-robot from the master and determining whether the plurality of modes of communication is a manual mode or an autonomous mode based on the application layer communication semantic and performing upon determining the plurality of modes of operation, one of a manual navigation of the tele-robot or in-situ intelligent navigation of the tele-robot. The system further includes one or more hardware processor configured for performing in-situ intelligent navigation of the tele-robot, receiving a depth map of the dynamic environment from a plurality of sensors and a goal point from the master, wherein the plurality of objects comprises of a plurality of static objects, a plurality of interactive objects and a plurality of dynamic objects. The system further includes one or more hardware processor configured for estimating a current position of the tele-robot based on a Simultaneous localization and mapping (SLAM) technique using a velocity associated with the tele-robot, wherein the velocity of the tele-robot is obtained using a plurality of sensors and the velocity includes an angular velocity and a linear velocity. The system further includes one or more hardware processor configured for method further includes generating a geo-centric top view map from the depth map using the current position of the tele-robot based on a spatial transform (ST) technique, wherein the geo-centric top view map is a geo-centric representation comprising the current position of the tele-robot and the location details of the plurality of objects. The system further includes one or more hardware processor configured for receiving a video feed of the dynamic environment at the tele-robot using the plurality of sensors, wherein the video feed is in RGB format. The system further includes one or more hardware processor configured for identifying the plurality of interactive objects and the plurality of dynamic objects in the video feed based on an object detection technique. The system further includes one or more hardware processor configured for estimating interactive object position or future position of the dynamic object. Finally, system further includes one or more hardware processor configured for includes determining a navigation local policy for the tele-robot by passing the geo-centric map through a Fast Marching Motion Planner (FMMP) using the goal points, the current position of the tele-robot and the interactive object position/the future dynamic object position Another embodiment provides a non-transitory computer-readable medium having embodied thereon a computer program for a computer readable program, wherein the computer readable program, when executed by one or more hardware processors, causes navigation of a tele-robot in dynamic environment using in-situ intelligence. The program includes initiating a communication between the tele-robot and the master. The communication is based on an application layer communication semantic and associated with a plurality of modes of operation that includes a manual mode and an autonomous mode. The program further includes receiving the communication regarding the mode of operation at the tele-robot from the master and determining whether the plurality of modes of communication is a manual mode or an autonomous mode based on the application layer communication semantic and performing upon determining the plurality of modes of operation, one of a manual navigation of the tele-robot or in-situ intelligent navigation of the tele-robot. The program further includes performing in-situ intelligent navigation of the tele-robot, receiving a depth map of the dynamic environment from a plurality of sensors and a goal point from the master, wherein the plurality of objects comprises of a plurality of static objects, a plurality of interactive objects and a plurality of dynamic objects. Further program includes estimating a current position of the tele-robot based on a Simultaneous localization and mapping (SLAM) technique using a velocity associated with the tele-robot, wherein the velocity of the tele-robot is obtained using a plurality of sensors and the velocity includes an angular velocity and a linear velocity. The program further includes generating a geo-centric top view map from the depth map using the current position of the tele-robot based on a spatial transform (ST) technique, wherein the geo-centric top view map is a geo-centric representation comprising the current position of the tele-robot and the location details of the plurality of objects. The program further includes receiving a video feed of the dynamic environment at the tele-robot using the plurality of sensors, wherein the video feed is in RGB format. The program further includes identifying the plurality of interactive objects and the plurality of dynamic objects in the video feed based on an object detection technique. The program further includes estimating interactive object position or future position of the dynamic object. Finally program includes determining a navigation local policy for the tele-robot by passing the geo-centric map through a Fast Marching Motion Planner (FMMP) using the goal points, the current position of the tele-robot and the interactive object position/the future dynamic object position.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Tele-robotics is the area of robotics concerned with the control of robots from a distance or a remote location. Telepresence robots are being used in a wide variety of other applications ranging from medicine to toxic waste cleanup to art installations. The tele-robotics system comprises of a master and at least one tele-robot, wherein the tele-robot is located at a remote location away from the master. The master and the tele-robot primarily to communicate using a wireless network/wireless communication such as a Wi-Fi®, BLUETOOTH®, a deep space network, and similar or tethered connections. The master and the tele-robot are connected over a public internet infrastructure, wherein the master sends commands to the tele-robot based on visual feedback from the tele-robot. There are two ways in which the master and the tele-robot communicate by application messages:

(a) Request message (from the master to the tele-robot),
(b) Response message (from the tele-robot to the master).

Figure 1:
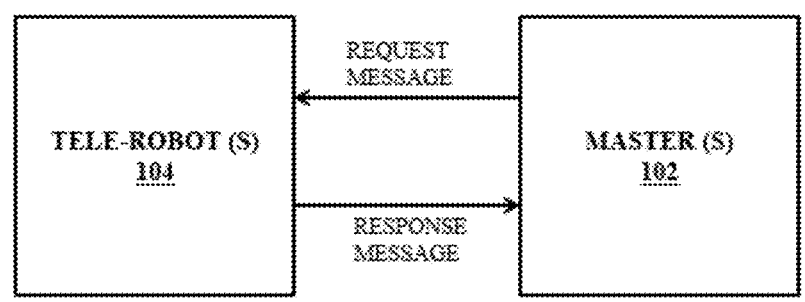
FIG. 1 illustrates a communication between a tele-robot and a master in accordance with some embodiments of the present disclosure.

An example scenario of the two way communication between a tele-robot 104 and a master is illustrated in FIG. 1. As illustrated, the system 100 of FIG. 1 comprises of a master 102 and at least a telerobot 104. The two way communication between a tele-robot 104 and a master 102 is implemented by at least on request message (from the master 102 to the tele-robot 104) and a plurality of response message (from the tele-robot 104 to the master 102).

Referring now to the drawings, and more particularly to FIG. 2 through FIG. 12 where similar reference characters denote corresponding features consistently throughout the figures, there are shown preferred embodiments and these embodiments are described in the context of the following exemplary system and/or method.

Figure 2:
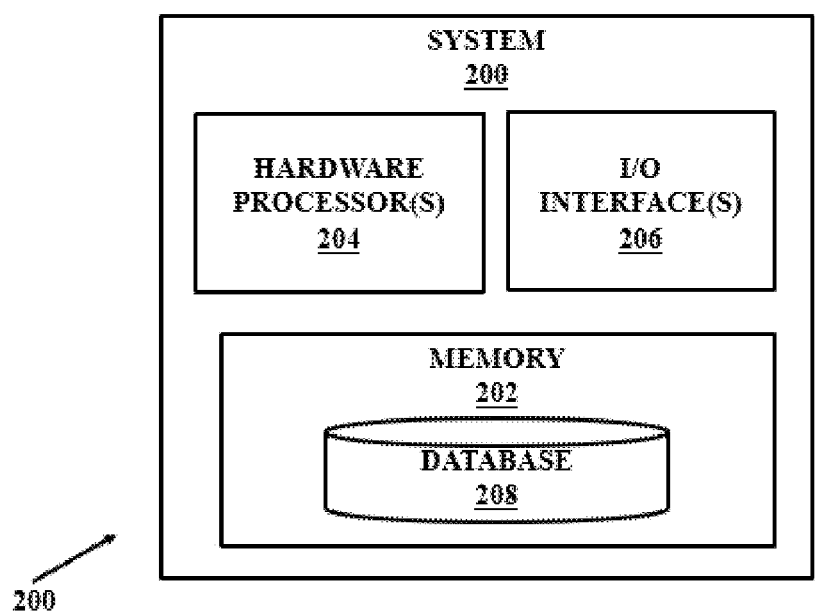
FIG. 2 illustrates an exemplary system in the tele-robot and the master of the FIG. 1 for navigation of a tele-robot in dynamic environment using in-situ intelligence in accordance with some embodiments of the present disclosure.

FIG. 2 is a functional block diagram of a system 200 for the navigation of a tele-robot 104 in dynamic environment using in-situ intelligence in accordance with some embodiments of the present disclosure. The system 200 is present within the master 102 and the telerobot 104 as shown in FIG. 1.

In an embodiment, the system 200 includes a processor(s) 204, communication interface device(s), alternatively referred as input/output (I/O) interface(s) 206, and one or more data storage devices or a memory 202 operatively coupled to the processor(s) 204. The system 200 with one or more hardware processors is configured to execute functions of one or more functional blocks of the system 200.

Referring to the components of system 200, in an embodiment, the processor(s) 204, can be one or more hardware processors 204. In an embodiment, the one or more hardware processors 204 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 204 is configured to fetch and execute computer-readable instructions stored in the memory 202. In an embodiment, the system 200 can be implemented in a variety of computing systems including laptop computers, notebooks, hand-held devices such as mobile phones, workstations, mainframe computers, servers, a network cloud and the like.

The I/O interface(s) 206 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 206 can include one or more ports for connecting a number of devices (nodes) of the system 200 to one another or to another server.

The memory 202 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 202 may include a database 208. Thus, the memory 202 may comprise information pertaining to input(s)/output(s) of each step performed by the processor(s) 204 of the system 200 and methods of the present disclosure. In an embodiment, the database 208 may be external (not shown) to the system 200 and coupled to the system via the I/O interface 206. Functions of the components of system 200 are explained in conjunction with the flow diagram of FIG. 3A, FIG. 3B and FIG. 3C for the navigation of a tele-robot 104 in dynamic environment using in-situ intelligence.

The system 200 supports various connectivity options such as BLUETOOTH®, USB®, ZigBee® and other cellular services. The network environment enables connection of various components of the system 200 using any communication link including Internet, WAN, MAN, and so on. In an exemplary embodiment, the system 200 is implemented to operate as a stand-alone device. In another embodiment, the system 200 may be implemented to work as a loosely coupled device to a smart computing environment. The components and functionalities of the system 200 are described further in detail.

As depicted in the architecture of the FIG. 2 various modules of the system 200 are configured to enable the navigation of a tele-robot 104 in dynamic environment using in-situ intelligence. The system 200 is configured for initiating a communication between the tele-robot 104 and the master 102, where the communication is based on an application layer communication semantic. The communication is associated with a plurality of modes of operation that includes a manual mode and an autonomous mode, and wherein the tele-robot 104 is located at a remote location in the dynamic environment. Further the system 200 is configured for receiving the communication regarding the mode of operation at the tele-robot 104 from the master 102, wherein the modes of operation is a manual mode or an autonomous mode. Based on the received mode of operation of communication between the master 102 and the telerobot, performing a manual navigation of the tele-robot 104 or performing an in-situ intelligent navigation of the tele-robot 104 in an autonomous mode. The various modules of the system 200 for the navigation of a tele-robot 104 in dynamic environment using in-situ intelligence are implemented as at least one of a logically self-contained part of a software program, a self-contained hardware component, and/or, a self-contained hardware component with a logically self-contained part of a software program embedded into each of the hardware component that when executed perform the above method described herein.

Figure 3A:
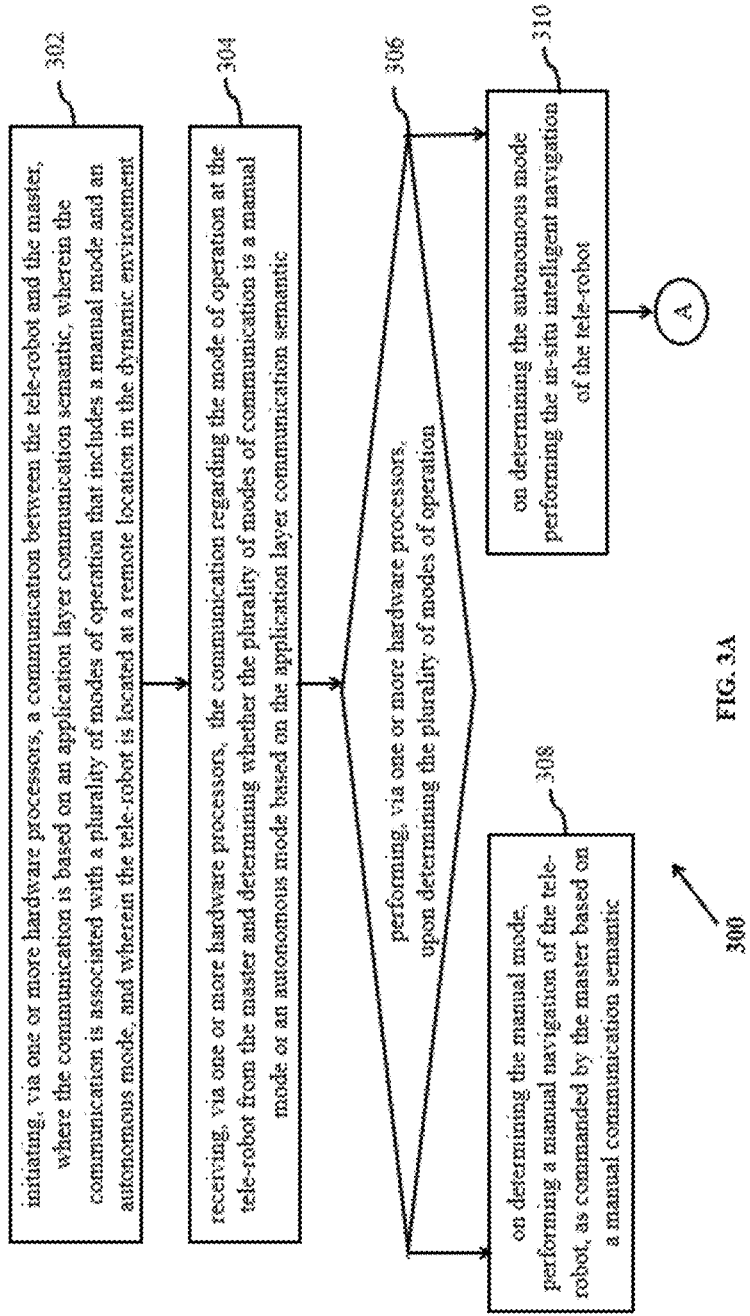
FIG. 3A, FIG. 3B and FIG. 3C is a flow diagram illustrating a method for navigation of a tele-robot in dynamic environment using in-situ intelligence in accordance with some embodiments of the present disclosure.
Figure 3B:
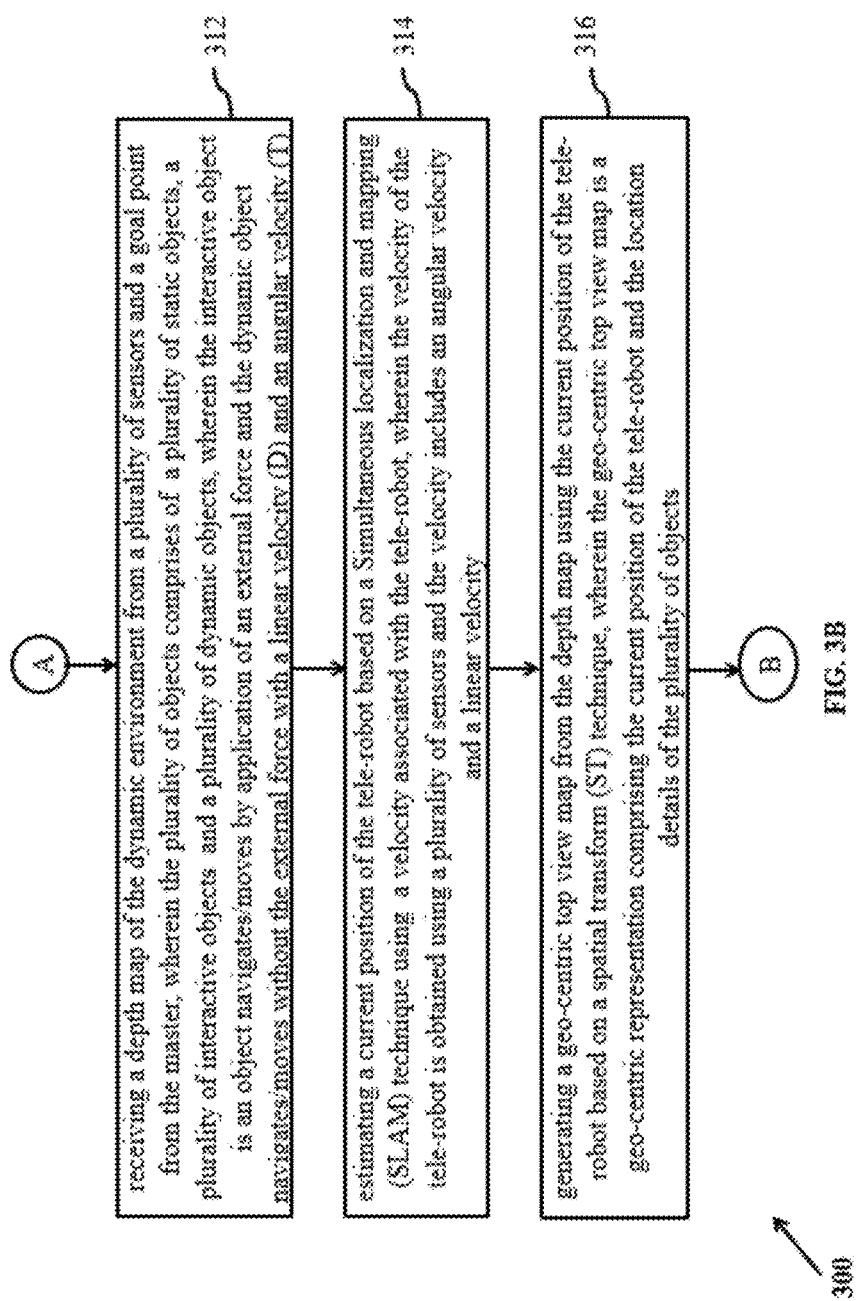
Figure 3C:
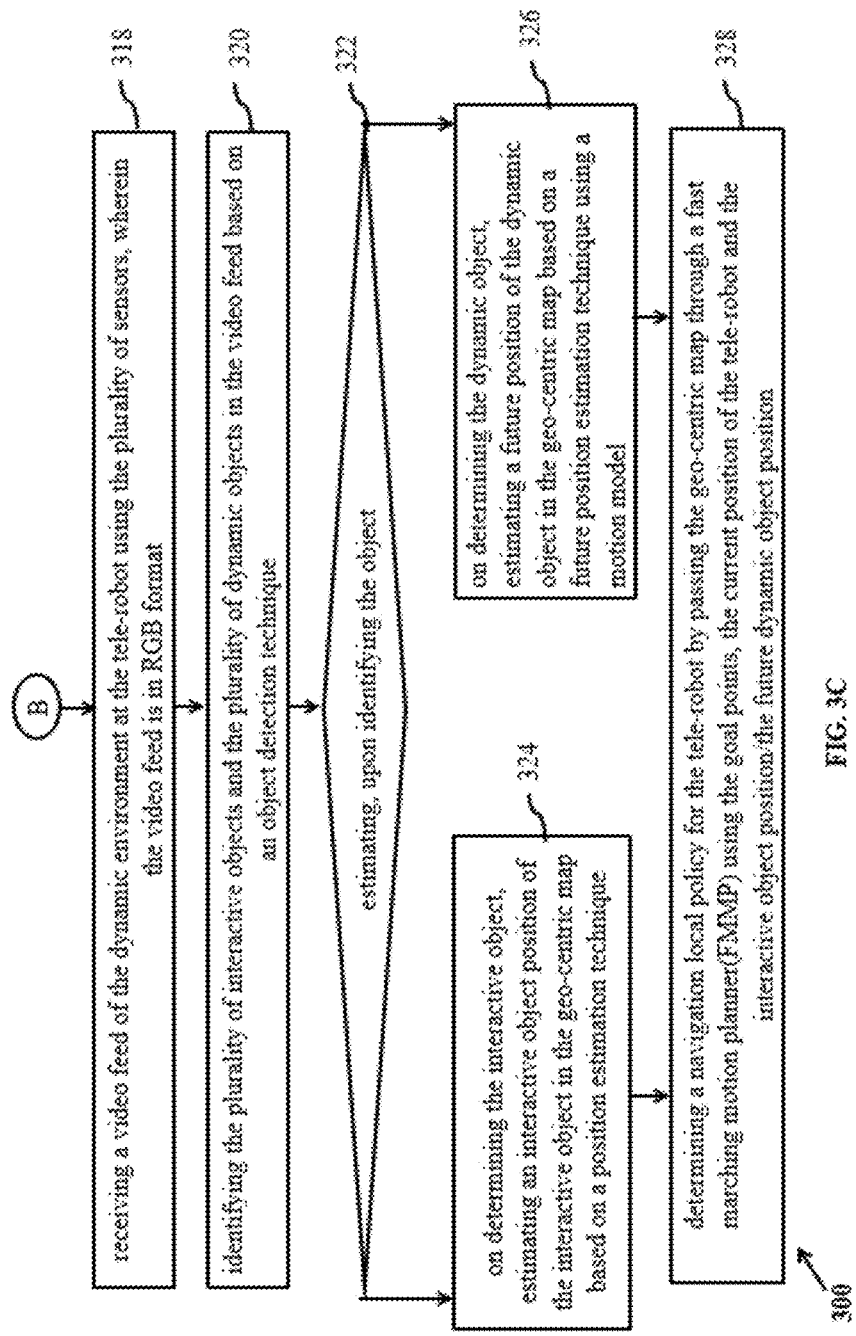

Functions of the components of the system 200 are explained in conjunction with functional modules of the system 200 stored in the memory 202 and further explained in conjunction with flow diagram of FIG. 3A, FIG. 3B and FIG. 3C. The FIG. 3A, FIG. 3B and FIG. 3C, with reference to FIG. 2, is an exemplary flow diagram illustrating a method 300 for using the system 200 of FIG. 2 according to an embodiment of the present disclosure.

The steps of the method of the present disclosure will now be explained with reference to the components of the navigation of a tele-robot 104 in dynamic environment using in-situ intelligence in the disclosed system (200) as depicted in FIG. 2 and the flow diagrams as depicted in the FIG. 3A, FIG. 3B and FIG. 3C.

Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method (300), a communication is initiated between the tele-robot 104 and the master 102, via one or more hardware processors 104, wherein the tele-robot 104 is located at a remote location in the dynamic environment. The communication is based on an application layer communication semantic. The communication is associated with a plurality of modes of operation. The plurality of modes of operation includes a manual mode and an autonomous mode. The manual mode of operation of the tele-robot 104 completely depends on a set of instructions to be shared by the master 102, whereas the autonomous mode of operation of the tele-robot 104 enables the tele-robot 104 to take its own decisions based on its own intelligence without any intervention/instructions from the master 102.

In an embodiment, the communication is a semi-persistent real-time communication involving a broker-less, peer-to-peer, or observer-producer relationship between the master 102 and the tele-robot 104. The term broker-less signifies that there is no intermediate entity, between the master 102 and the tele-robot 104, acting as broker to register each request from master 102 as an independent topic of interest and responses from the tele-robot 104 corresponding to a particular request and, on the other hand, store the responses published by the tele-robot 104. The term peer-to-peer indicated the master 102 and the tele-robot 104 communicate over a direct packet-data channel without requiring an intermediate session manager to enable the exchange over the Internet. The observer-producer, wherein after each plurality of modes of operation (manual or automatic), the master 102 initiates a semi-persistent logical connection where a master 102 node of the master 102 becomes an observer observing the state of the tele-robot 104 on the move and the tele-robot 104 becomes a publisher/producer periodically updating its status.

In an embodiment, the application layer communication semantic comprises an application-layer message exchange protocol between the tele-robot 104 and the master 102 that includes a request message from the master 102 to the tele-robot 104 and a plurality of response messages from the tele-robot 104 to the master 102, wherein an application-layer message includes binary representations of a type and a corresponding value for each type. The request messages indicate whether the communication/message is for a point goal instruction or for a general kinematic command, while in a special case the request message can indicate an urgent interrupt to stop the process in whatever state it is. An example scenario of a packet structure for request messages in the application layer communication semantic, wherein the packet structure for request messages comprises of a command_type and a command_value, is as illustrated in Table.1 below:

TABLE 1

An example packet structure for a request message.

| Command_type (1 byte) | Command_value (0-4 bytes) |
|---|---|

In an embodiment, an example scenario of a possible command_type and command_value interpretations are as shown in Table 2 below:

TABLE 2

Command_type and command_value interpretations

| Command_type | Command_value |
|---|---|
| 0x00 | Kinematics control indicator (numeric values representing fwd, bkwd, right rotate, left rotate, etc.) |
| 0x01 | Represents the destination (x, y) coordinates |
| 0x02 | Reserved |
| 0x03 | Interrupt to stop the operation. |
| 0x04 - 0xFF | Reserved |

An example scenario of a packet structure for response messages in the application layer communication semantic, wherein the packet structure for response messages comprises of a response_type and a response_value, is as illustrated in Table.3 below.

TABLE 3

An example packet structure for a response message.

| Response_type (1 byte) | Response_value (0-4 bytes) |
|---|---|

In an embodiment, an example scenario of possible response_type and response_value interpretations are as shown in Table 4 below:

TABLE 4

Response_type and response_value interpretations.

| Response_type | Response_value |
|---|---|
| 00 | Live odometry |
| 01 | Destination reached |

TABLE 4-continued

Response_type and response_value interpretations.

| Response_type | Response_value |
|---|---|
| 10 | Reserved |
| 11 | Aborting |

An auto-navigation is on the master 102 console keeps a manual control mechanism disabled and enables only after an abort or successful combination indicator. The above messages can be transferred over any underlying transport having transport level acknowledgement. Once exemplary case may be the WebRTC (Real-Time Communication for the Web) data channel running on SCTP (Stream Control Transmission Protocol) or a CoAP (Constrained Application Protocol) with CON (Confirmable) mode. The underlying transport can use any custom mechanism on TCP (Transmission ControlProtocol) or QUIC (Quick UDP Internet Connections) where UDP is abbreviation for User Datagram Protocol, etc.

Figure 4:
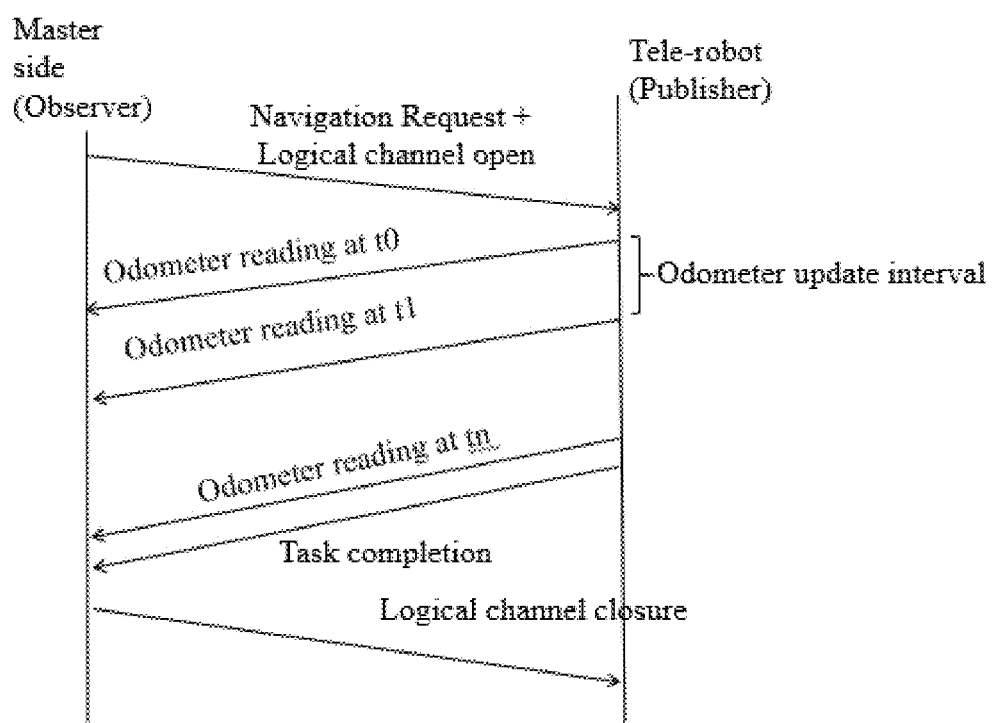
FIG. 4 illustrates an application layer communication semantic between the tele-robot and the master of the FIG. 1, wherein an exemplary example of a handshake for a graceful command termination between the tele-robot and the master is illustrated in accordance with some embodiments of the present disclosure.
Figure 5:
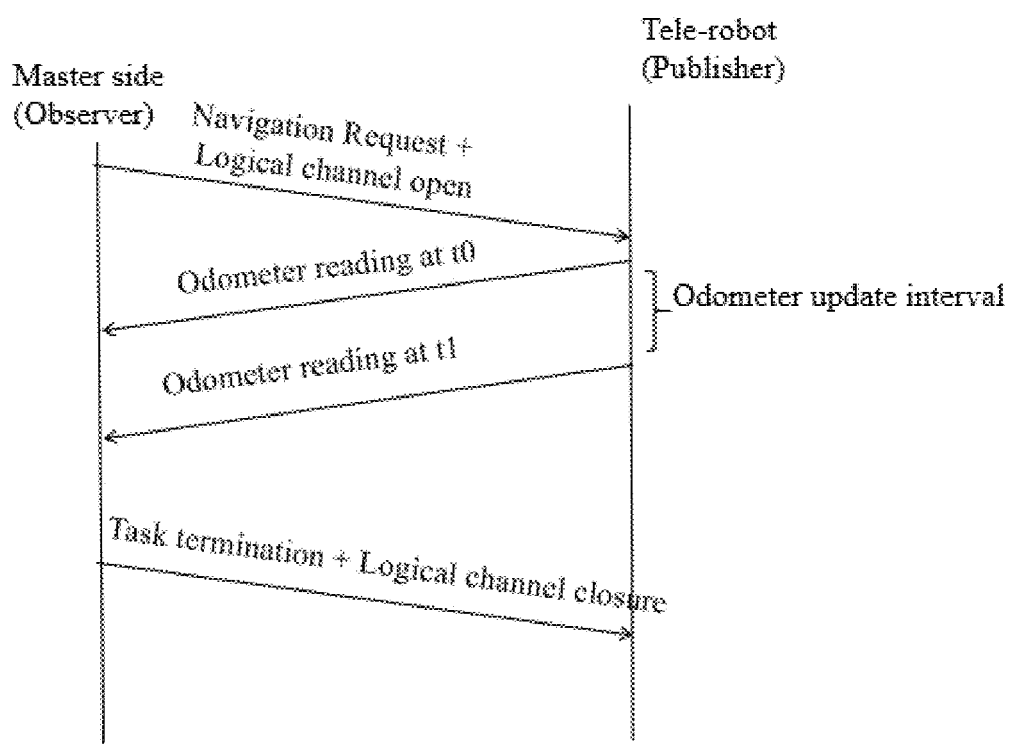
FIG. 5 illustrates an application layer communication semantic between the tele-robot and the master of the FIG. 1, wherein an exemplary example of termination initiated by the master is illustrated in accordance with some embodiments of the present disclosure.

In an embodiment, FIG. 4 and FIG. 5 illustrates an application layer communication semantic between the tele-robot 104 and the master 102. The FIG. 4 is an exemplary example of a handshake for a graceful command termination between the tele-robot 104 and the master 102. The FIG. 5 is an exemplary example of termination initiated by the master 102. Each request from the master 102 initiates an Observer-Publisher relationship between the master 102 and the tele-robot 104 where the master 102 becomes an observer and the tele-robot 104 becomes a publisher. After triggering the request containing a typical navigation command instruction, the master 102 keeps on observing the state of the ongoing execution of the command as published by the tele-robot 104 periodically as responses. The responses may contain in instantaneous odometer reading of the tele-robot 104 or it may indicate the end of execution of the request. The end of execution may be due to successful completion of the command in the request as shown in FIG. 4 or may be due to preemptive termination. The preemption may happen due to either proactive termination command by the master 102 based on inference of the remote context through the video feed from the tele-robot 104 or may be due to in situ decision to terminate a task by the tele-robot 104 itself, while the later may happen due to many possible causes like mechanical failure, depletion of battery, etc.

At step 304 of the method (300), receiving the communication regarding the mode of operation at the tele-robot 104 from the master 102 via one or more hardware processors. Further determining whether the plurality of modes of communication is a manual mode or an autonomous mode based on the content of the 1$^{st}$ byte of the request packet as shown in Table 1. If the byte is 0x00 then it is interpreted by the tele-robot 104 that the request contains manual navigation instruction and the next bytes are interpreted to contain granular movement commands. If the byte contains 0x01 then the tele-robot 104 interprets the request to contain auto-navigation instruction and the next bytes contain the binary representation of the (x, y) coordinate of the desired destination indicated by the master 102 in the remote video.

At step 306 of the method (300), upon determining the plurality of modes of operation, performing one of:
(a) At step 308, on determining the manual mode, performing a manual navigation of the tele-robot 104, as commanded by the master 102 based on a manual communication semantic.
(b) At step 310, on determining the autonomous mode, performing the in-situ intelligent navigation of the tele-robot 104.

At step 308, in an embodiment, the manual communication semantic technique comprises a granular step by step navigation request sent to the tele-robot 104 by the master 102 based on a video feed response shared by the tele-robot 104 with the master 102. In an example scenario the granular step by step commands depends on specific application. For example, the value 0x01 may indicate "forward move", 0x02 may indicate "backward move", 0x03 may indicate "rotate right", 0x04 may indicate "rotate left", etc. The exact distance covered in each granular movement is application dependent.

At step 310 of the method (300), performing the in-situ intelligent navigation of the tele-robot 104, comprising several steps that are depicted in FIG. 3B and FIG. 3C. The in-situ intelligent navigation refers to the tele-robot 104 moving to a specific destination by sensing and inferring the environment and deciding the trajectory to reach the destination through its own intelligence as configured by the disclosed method.

At step 312 of the method (300), receiving a depth map of the dynamic environment from a plurality of sensors and a goal point from the master 102. The plurality of objects comprises of a plurality of static objects, a plurality of interactive objects and a plurality of dynamic objects. The interactive object is an object navigates/moves by application of an external force and the dynamic object navigates/moves without the external force with a linear velocity (D) and an angular velocity (T)

In an embodiment, a few examples for an interactive object is a chair, a table, a curtain, a cycle and a car all of which cannot move by itself but can move/navigate by application of an external force. Further a few examples for a dynamic object are a bird, an animal or a human, all of which navigates/moves by itself (at its own will) without the external force with a linear velocity (D) and an angular velocity (T).

Figure 6:
FIG. 6 illustrates a sample depth map utilized for navigation of a tele-robot in dynamic environment using in-situ intelligence in accordance with some embodiments of the present disclosure.

In an embodiment, a sample depth map has been shared in the FIG. 6, wherein the depth map comprises of a plurality of static objects, a plurality of interactive objects and a plurality of dynamic objects.

At step 314 of the method (300), a current position of the tele-robot 104 is estimated based on a Simultaneous localization and mapping (SLAM) technique using a velocity associated with the tele-robot 104, wherein the velocity of the tele-robot 104 is obtained using a plurality of sensors and the velocity includes an angular velocity and a linear velocity.

In an embodiment, the Simultaneous localization and mapping (SLAM) technique includes an active neural SLAM technique. Further the plurality of sensors includes a red green and blue (RGB) camera, an odometer and a depth sensor. The velocity of the tele-robot 104 is obtained using a odometer.

At step 316 of the method (300), a geo-centric top view map is generated from the depth map using the current position of the tele-robot 104 based on a spatial transform (ST) technique, wherein the geo-centric top view map is a geo-centric representation comprising the current position of the tele-robot 104 and the location details of the plurality of objects.

Figure 7A:
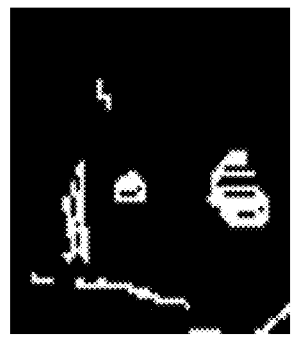
FIG. 7A illustrates an ego map (a top view of the depth map) and FIG. 7B illustrates a geocentric map utilized for navigation of a tele-robot in dynamic environment using in-situ intelligence in accordance with some embodiments of the present disclosure.
Figure 7B:
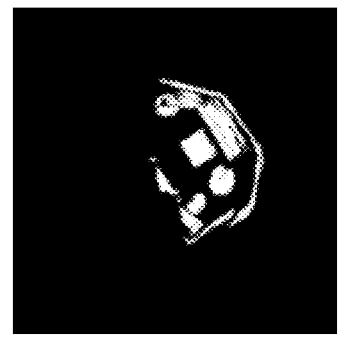

In an embodiment, the depth map is converted to an ego map which is a top view of the depth map. The ego map is then projected at the current location of the robot using Spatial Transformation (ST) which then updates the geocentric map. In an example scenario the ego map which is a top view of the depth map is illustrated in FIG. 7A and the geocentric map is illustrated in FIG. 7B.

At step 318 of the method (300), a video feed of the dynamic environment is received at the tele-robot 104 using the plurality of sensors, wherein the video feed is in RGB format.

Figure 8:
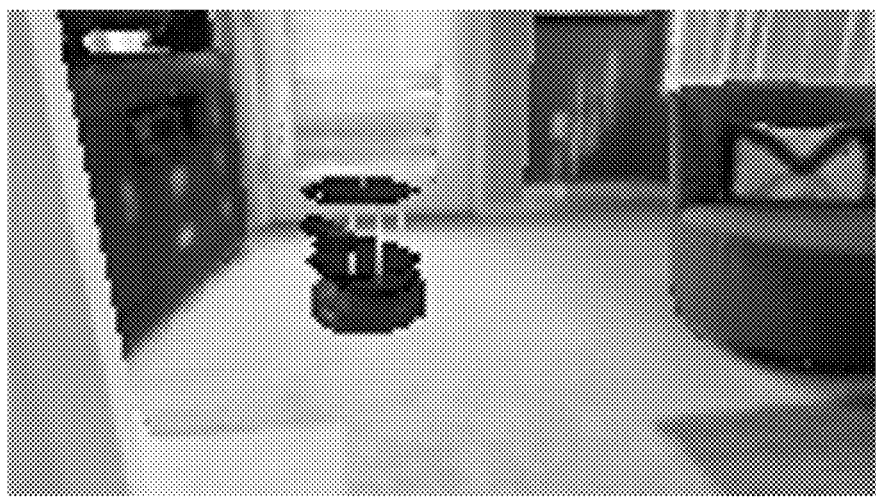
FIG. 8 illustrates a video feed of the dynamic environment as received by the tele-robot in RGB format to be utilized for navigation of a tele-robot in dynamic environment using in-situ intelligence in accordance with some embodiments of the present disclosure.

In an embodiment, an RGB format image has been illustrated in black and white format in FIG. 8.

At step 320 of the method (300), the plurality of interactive objects and the plurality of dynamic objects are identified in the video feed based on an object detection technique.

In an embodiment, object detection technique includes You Only Look Once (YOLO™) object detection techniques, Single Shot Detector (SSD), Spatial Pyramid Pooling (SPP-net), Fast R-Convolutional neural network (CNN) and Faster R-CNN etc., At step 322 of the method (300), estimating upon identifying the object, one of:
  (a) At step 324, on determining the interactive object—estimating an interactive object position of the interactive object in the geo-centric map based on a position estimation technique.
  (b) At step 326, determining the dynamic object—estimating a future position of the dynamic object in the geo-centric map, based on a future position estimation technique using a motion model.

Figure 9:
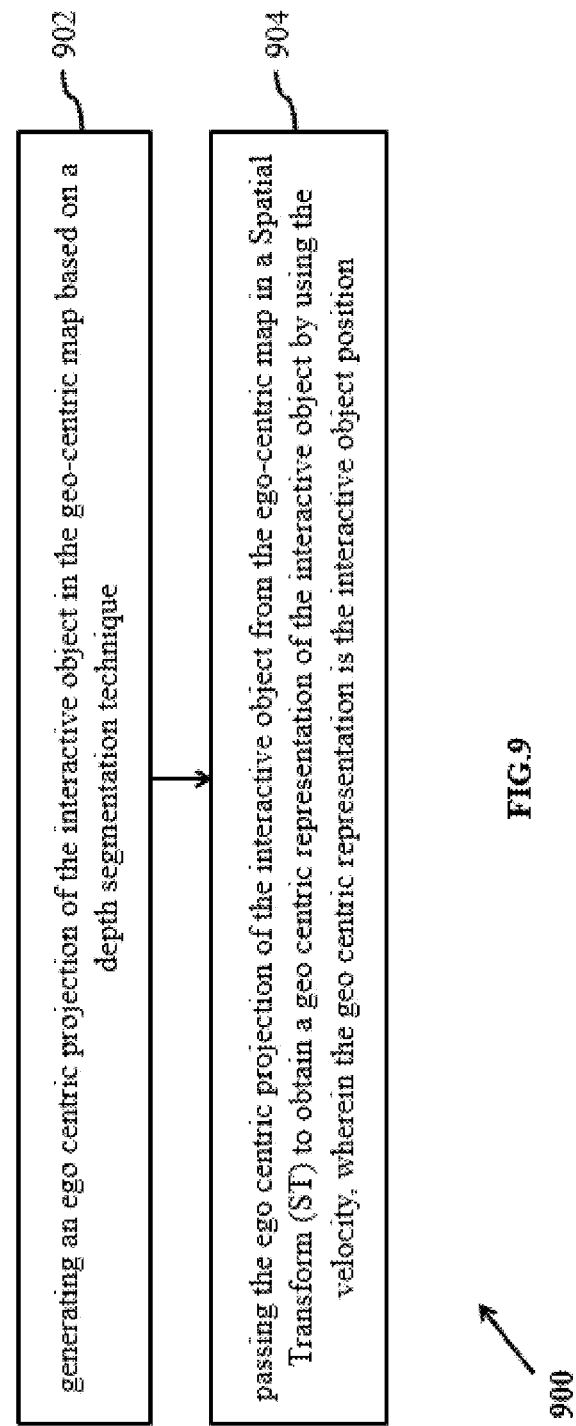
FIG. 9 is a flow diagram illustrating a method for position estimation technique during in the navigation of a tele-robot in dynamic environment using in-situ intelligence in accordance with some embodiments of the present disclosure.

Referring to FIG. 9, wherein the flowchart illustrates steps for estimating an interactive object position, which is explained below:

At step 902 of the method (900), generating an ego centric projection of the interactive object in the geo-centric map based on a depth segmentation technique.

In an embodiment, the segmentation technique involves segregation of the depth map of the interactive object from the rest of the depth map by overlaying it on top of the object detection bounding box and only taking the pixels inside the box. Since the depth values for the obstacle is different from the background, because the obstacle is closer to the camera than a background, a threshold of depth values gives the exact outline of the interactive object in the depth map. The depth values obtained inside this outline is then projected in the geocentric map using the Spatial Transformation technique.

At step 904 of the method (900), passing the ego centric projection of the interactive object from the ego-centric map in a Spatial Transform (ST) to obtain a geo centric representation of the interactive object by using the velocity, wherein the geo centric representation is the interactive object position.

Figure 10:
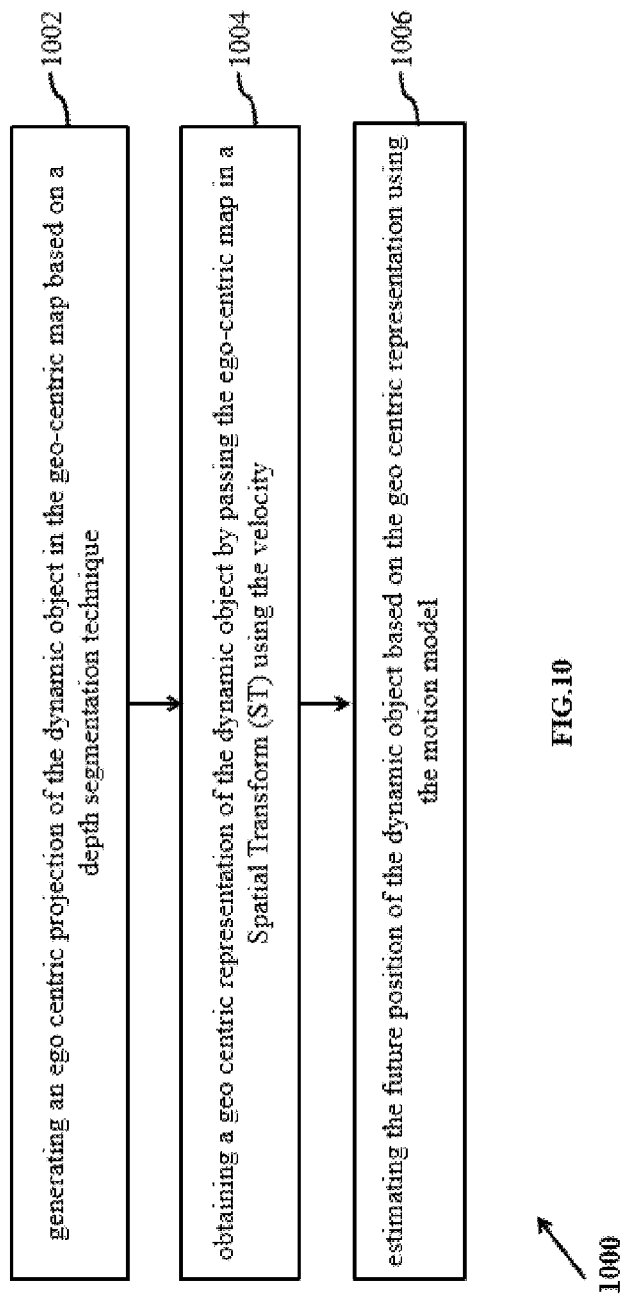
FIG. 10 is a flow diagram illustrating a method for future position estimation technique during in the navigation of a tele-robot in dynamic environment using in-situ intelligence in accordance with some embodiments of the present disclosure.

Referring to FIG. 10, wherein the flowchart illustrates steps for estimating a future position of the dynamic object in the geo-centric map on determining the dynamic object, based on a future position estimation technique using a motion model.

At step 1002 of the method (1000), generating an ego centric projection of the dynamic object in the geo-centric map based on a depth segmentation technique In an embodiment, the segmentation technique involves segregation of the depth map of the dynamic object from the rest of the depth map by overlaying it on top of the dynamic object detection bounding box and only taking the pixels inside the box. Since the depth values for the obstacle is different from the background, because the dynamic object is closer to the camera than a background, a threshold of depth values gives the exact outline of the dynamic object in the depth map. The depth values obtained inside this outline is then projected in the geocentric map using the Spatial Transformation technique.

At step 1004 of the method (1000), obtaining a geo centric representation of the dynamic object by passing the ego-centric map in a Spatial Transform (ST) using the velocity.

In an embodiment, the depth map of the dynamic object is segregated from the rest of the depth map by overlaying it on top of the object detection bounding box and only taking the pixels inside the box. As the depth values for the obstacle is different from the background, the obstacle is closer to the camera than a background, a threshold of depth values gives the exact outline of the dynamic obstacle in the depth map. The depth values obtained inside the outline is then projected in the geocentric map using the Spatial Transformation technique. Further to obtain the center of the obstacle, a Blob Center detection using OpenCV from the detected dynamic obstacle is used.

At step 706 of the method (700), estimating the future position of the dynamic object based on the geo centric representation using the motion model.

In an embodiment, the motion model is mathematically deduced as shown below:

Let, $(x_t, y_t)$=Centre of the obstacle in 2D space at time t $\theta_t$=Angular orientation of the obstacle in 2D space.

D=Eucledian distance between the two obstacle centers in 2 consecutive time-stamps T=Angular displacement between two obstacle orientations in 2 consecutive time-stamps $r_0$=Actual radius of the obstacle in a 2D space at initiation $r_{t+1}$=Diminished radius of the obstacle at time t+1 n=Number of diminishing time-stamps (typical value=5)

$$x_{t+1} = x_t + D.\cos\theta_t$$

$$y_{t+1} = y_t + D.\cos\theta_t$$

$$\theta_{t+1} = \theta_t + T$$

$$r_{t+1} = r_o + ((n - (T+1))/n)$$

$$M(x_t, y_t, r_t) \begin{cases} = 1 \text{ if } (x-x_t)^2 + (y-y_t)^2 \leq r_t^2 \\ = 0 \text{ if } (x-x_t)^2 + (y-y_t)^2 \leq r_t^2 \end{cases}$$

Where,

M $(x_t, y_t, r_t)$=Predicted future position of obstacle with diminishing radius at time-stamp t.

Hence the occupancy of the obstacle as a function of time on the predicted future trajectory can be modeled as: $\Sigma_{t=0}^{n-1} M(x_t, y_t, r_t)$ Referring back to FIG. 3C, at step 328 of the method (300), a navigation local policy for the tele-robot 104 is determined by passing the geo-centric map through a Fast Marching Motion Planner (FMMP) using the goal points, the current position of the tele-robot 104 and the interactive object position/the future dynamic object position.

In an embodiment, the fast marching method is a numerical technique for finding approximate solutions to boundary value problems of an Eikonal equation and can be expressed as shown below:

$$F(x)|\nabla T(x)|=1$$

Figure 11B:
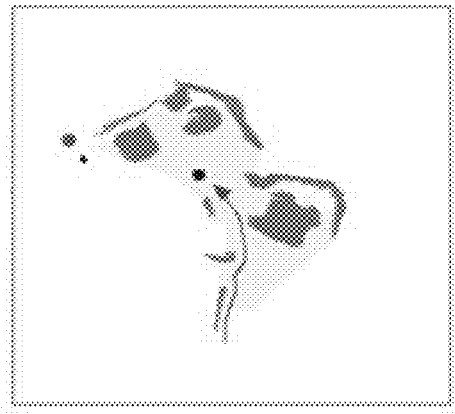
FIG. 11A illustrates an example scenario of the input video feed and the FIG. 11B illustrates a navigation local policy generated based on the disclosed in-situ intelligent navigation method.
Figure 11A:
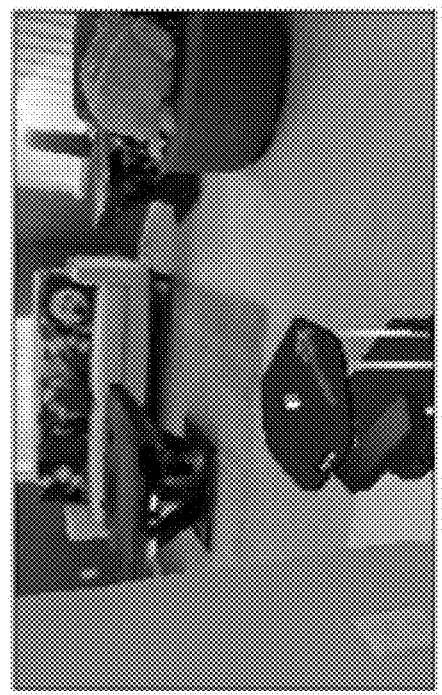

An example scenario has been illustrated in FIG. 11A and FIG. 11.B, wherein the FIG. 11.A illustrates an input video feed is and FIG. 11B illustrates the navigation local policy generated using the disclosed in-situ intelligent navigation techniques.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Experimental Results

Figure 12:
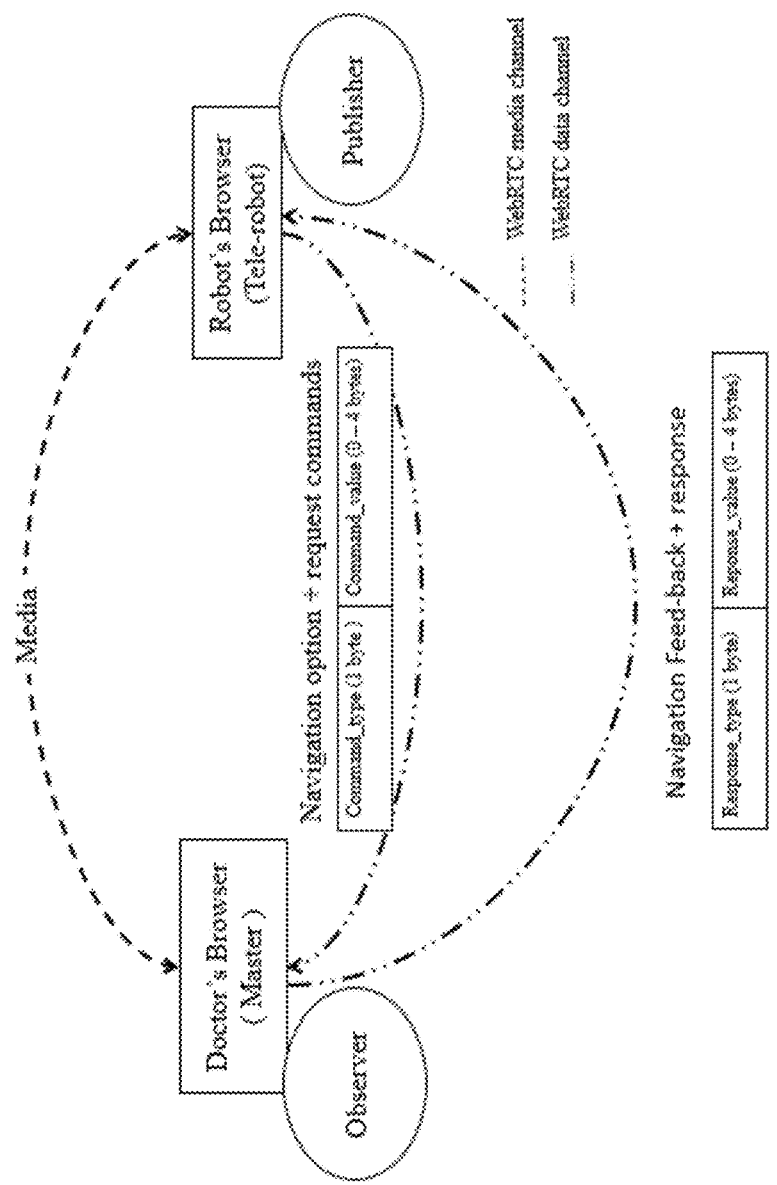
FIG. 12 illustrates example scenario a doctor-patient interaction using the disclosed method of navigation of a tele-robot in dynamic environment using in-situ intelligence in accordance with some embodiments of the present disclosure.
Figure 13:
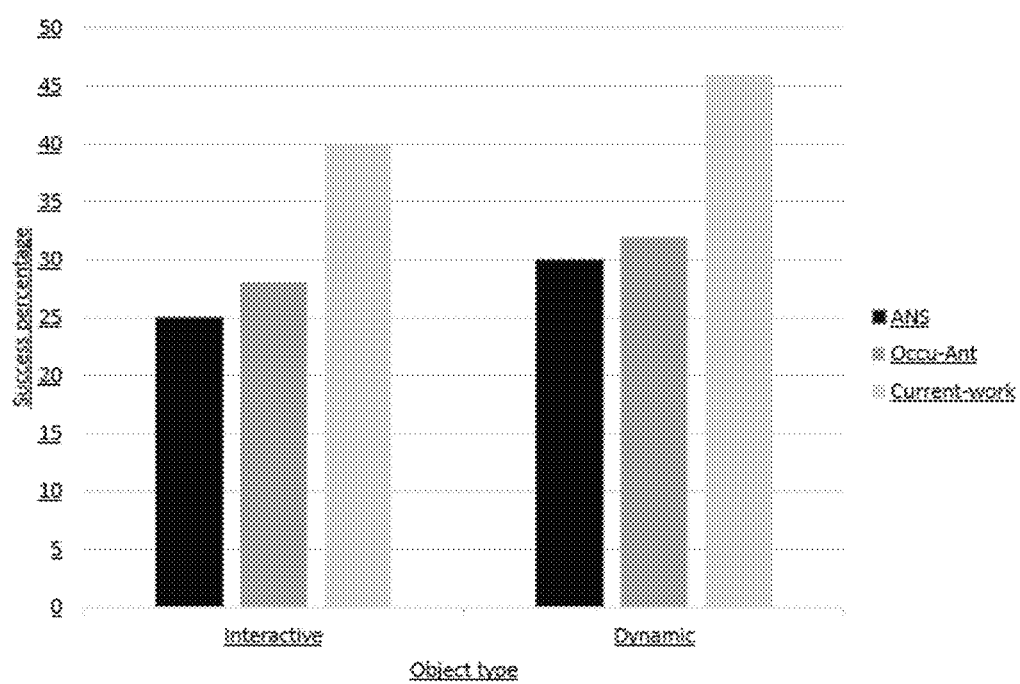
FIG. 13 illustrates example scenario of a graph of percent success for the experiment of doctor-patient interaction (from the FIG. 12) using the disclosed method of navigation of a tele-robot in dynamic environment using in-situ intelligence in accordance with some embodiments of the present disclosure.

An experiment has been conducted for a doctor-patient interaction. The experiment has been conducted based on state of art techniques (active neural SLAM and occupancy anticipation techniques) and the present disclosure of navigation of a tele-robot in dynamic environment using in-situ intelligence. During the doctor-patient interaction, the patient is in isolation and the tele-robot is in communication (based on disclosed application layer communication semantic) with a master that is located in a different location as shown in FIG. 12. During the course of communication, the master shares an autonomous mode based on the application layer communication semantic to the tele-robot. The experimental results have been illustrated as a graph in FIG. 13, wherein the y-axis represents a success percentage that is indicative of (a) no collision (b) navigation till goal point. Further the x-axis represents the types of objects, specially the interactive object and the dynamic object identification and non-collision as experimented based on 3 types of techniques—active neural SLAM, occupancy anticipation techniques and the present disclosure (represented as current work on the graph).

The embodiment of present disclosure herein is a method and a system for navigation of a tele-robot in dynamic environment using in-situ intelligence. Tele-robotics is the area of robotics concerned with the control of robots (tele-robots) in a remote environment from a distance. In reality, the remote environment where the tele robot navigates may be dynamic in nature with unpredictable movements, making the navigation extremely challenging. The disclosure proposes an in-situ intelligent navigation of a tele-robot in a dynamic environment. The disclosed in-situ intelligence enables the tele-robot to understand the dynamic environment by identification and estimation of future location of objects based on a generating/training a motion model. Further the disclosed techniques also enable communication between a master 102 and the tele-robot (whenever necessary) based on an application layer communication semantic.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor-implemented method for in-situ intelligent navigation of a tele-robot in a dynamic environment characterized by a tele-robot and a master, the method comprising the steps of:

initiating, via one or more hardware processors, a communication between the tele-robot and the master, where the communication is based on an application layer communication semantic, wherein the communication is associated with a plurality of modes of operation that includes a manual mode and an autonomous mode, and wherein the tele-robot is located at a remote location in the dynamic environment;

receiving, via one or more hardware processors, the communication regarding the mode of operation at the tele-robot from the master and determining whether a current mode of operation is the manual mode or the autonomous mode based on the application layer communication semantic and initiating a semi-persistent logical connection where a master node of the master becomes an observer observing the state of the tele-robot on the move and the tele-robot becomes a publisher/producer by periodically updating status; and performing, via one or more hardware processors, upon determining the plurality of modes of operation:
on determining the current mode of operation of the tele-robot to be the manual mode, performing a manual navigation of the tele-robot, as commanded by the master based on a manual communication semantic;
on determining the current mode of operation of the tele-robot to be the autonomous mode, performing the in-situ intelligent navigation of the tele-robot, comprising the steps of:
receiving a depth map of the dynamic environment from a plurality of sensors and a goal point from the master, wherein a plurality of objects comprises of a plurality of static objects, a plurality of interactive objects and a plurality of dynamic objects, wherein an interactive object is an object which navigates or moves by application of an external force and a dynamic object navigates or moves without the external force with a linear velocity (D) and an angular velocity (T), wherein the external force refers to a force external to the dynamic object or the interactive object;
estimating a current position of the tele-robot based on a Simultaneous localization and mapping (SLAM) technique using a velocity associated with the tele-robot, wherein the velocity of the tele-robot is obtained using the plurality of sensors and the velocity includes an angular velocity and a linear velocity;
generating a geo-centric top view map from the depth map using the current position of the tele-robot based on a spatial transform (ST) technique, wherein the depth map is converted to an ego-centric map which is a top view of the depth map and the ego-centric map is projected at the current position of the tele-robot using the ST technique to generate the geo-centric top view map, wherein the geo-centric top view map comprises the current position of the tele-robot and location details of the plurality of objects;
receiving a video feed of the dynamic environment at the tele-robot using the plurality of sensors, wherein the video feed is in RGB format;
identifying the plurality of interactive objects and the plurality of dynamic objects in the video feed based on an object detection technique;
estimating, on determining an object of the plurality of objects as being an interactive object or a dynamic object:
on determining the object is an interactive object, estimating an interactive object position of the interactive object in the geo-centric map based on a position estimation technique; and
on determining the object is a dynamic object, estimating a future position of the dynamic object in the geo-centric map based on a future position estimation technique using a motion model, wherein the future position estimation technique includes the following steps:
generating an ego centric projection of the dynamic object in the geo-centric map based on a depth segmentation technique, wherein the generation of the ego centric projection of the dynamic object in the geo-centric map based on the depth segmentation technique includes segregation of a depth map of the dynamic object from the rest of the depth map;
obtaining a geo centric representation of the dynamic object by passing an ego-centric map in a Spatial Transform (ST) using the velocity; and
estimating the future position of the dynamic object based on the geo centric representation of the dynamic object using the motion model; and
determining a navigation local policy for the tele-robot by passing the geo-centric map through a Fast Marching Motion Planner (FMMP) using the goal point, the current position of the tele-robot and the interactive object position or the future dynamic object position.

2. The method of claim 1, wherein the application layer communication semantic comprises an application-layer message exchange protocol between the tele-robot and the master that includes a request message from the master to the tele-robot and a plurality of response messages from the tele-robot to the master, wherein an application-layer message includes binary representations of a type and a corresponding value for each type.

3. The method of claim 1, wherein the manual communication semantic technique comprises a step by step navigation request sent to the tele-robot by the master based on a video feed response shared by the tele-robot with the master.

4. The method of claim 1, wherein the Simultaneous localization and mapping (SLAM) technique includes an active neural SLAM technique, and the plurality of sensors includes a red, green, and blue (RGB) camera, an odometer, and a depth sensor.

5. The method of claim 1, wherein the motion model estimates a future trajectory for the dynamic object with a geometrically diminished radius for pre-defined time-stamps based on the linear velocity (D) of the dynamic object.

6. A system, comprising:
an input/output interface;
one or more memories; and
one or more hardware processors, the one or more memories coupled to the one or more hardware processors, wherein the one or more hardware processors are configured to execute programmed instructions stored in the one or more memories, to:
initiate, via one or more hardware processors, a communication between the tele-robot and the master, where the communication is based on an application layer communication semantic, wherein the communication is associated with a plurality of modes of operation that includes a manual mode and an autonomous mode, and wherein the tele-robot is located at a remote location in the dynamic environment;

receive, via one or more hardware processors, the communication regarding the mode of operation at the tele-robot from the master and determining whether a current mode of operation is the manual mode or the autonomous mode based on the application layer communication semantic and initiating a semi-persistent logical connection where a master node of the master becomes an observer observing the state of the tele-robot on the move and the tele-robot becomes a publisher/producer by periodically updating status; and perform, via one or more hardware processors, upon determining the plurality of modes of operation:

on determining the current mode of operation of the tele-robot to be the manual mode, perform a manual navigation of the tele-robot, as commanded by the master based on a manual communication semantic;

on determining the current mode of operation of the tele-robot to be the autonomous mode, perform the in-situ intelligent navigation of the tele-robot, comprising the steps of:

receiving a depth map of the dynamic environment from a plurality of sensors and a goal point from the master, wherein a plurality of objects comprises of a plurality of static objects, a plurality of interactive objects and a plurality of dynamic objects, wherein an interactive object is an object which navigates or moves by application of an external force and a dynamic object navigates/or moves without the external force with a linear velocity (D) and an angular velocity (T), wherein the external force refers to a force external to the dynamic object or the interactive object;

estimating a current position of the tele-robot based on a Simultaneous localization and mapping (SLAM) technique using a velocity associated with the tele-robot, wherein the velocity of the tele-robot is obtained using the plurality of sensors and the velocity includes an angular velocity and a linear velocity;

generating a geo-centric top view map from the depth map using the current position of the tele-robot based on a spatial transform (ST) technique, wherein the depth map is converted to an ego-centric map which is a top view of the depth map and the ego-centric map is projected at the current position of the tele-robot using the ST technique to generate the geo-centric top view map, wherein the geo-centric top view map comprises the current position of the tele-robot and location details of the plurality of objects;

receiving a video feed of the dynamic environment at the tele-robot using the plurality of sensors, wherein the video feed is in RGB format;

identifying the plurality of interactive objects and the plurality of dynamic objects in the video feed based on an object detection technique;

estimating, on determining an object of the plurality of objects as being an interactive object or a dynamic object:

on determining the object is an interactive object, estimating an interactive object position of the interactive object in the geo-centric map based on a position estimation technique; and on determining the object is a dynamic object, estimating a future position of the dynamic object in the geo-centric map based on a future position estimation technique using a motion model, wherein the future position estimation technique includes the following steps:

generating an ego centric projection of the dynamic object in the geo-centric map based on a depth segmentation technique, wherein the generation of the ego centric projection of the dynamic object in the geo-centric map based on the depth segmentation technique includes segregation of a depth map of the dynamic object from the rest of the depth map obtaining a geo centric representation of the dynamic object by passing an ego-centric map in a Spatial Transform (ST) using the velocity; and estimating the future position of the dynamic object based on the geo centric representation of the dynamic object using the motion model; and determining a navigation local policy for the tele-robot by passing the geo-centric map through a Fast Marching Motion Planner (FMMP) using the goal point, the current position of the tele-robot and the interactive object position or the future dynamic object position.

7. A non-transitory computer-readable medium having embodied thereon a computer readable program, wherein the computer readable program when executed by one or more hardware processors, cause:

initiating, via one or more hardware processors, a communication between the tele-robot and the master, where the communication is based on an application layer communication semantic, wherein the communication is associated with a plurality of modes of operation that includes a manual mode and an autonomous mode, and wherein the tele-robot is located at a remote location in the dynamic environment;

receiving, via one or more hardware processors, the communication regarding the mode of operation at the tele-robot from the master and determining whether a current mode of operation is a manual mode or an autonomous mode based on the application layer communication semantic and initiating a semi-persistent logical connection where a master node of the master becomes an observer observing the state of the tele-robot on the move and the tele-robot becomes a publisher/producer by periodically updating status; and performing, via one or more hardware processors, upon determining the plurality of modes of operation on determining the current mode of operation of the tele-robot to be the manual mode, performing a manual navigation of the tele-robot, as commanded by the master based on a manual communication semantic;

on determining the current mode of operation of the tele-robot to be the autonomous mode, performing the in-situ intelligent navigation of the tele-robot, comprising the steps of:

receiving a depth map of the dynamic environment from a plurality of sensors and a goal point from the master, wherein a plurality of objects comprises of a plurality of static objects, a plurality of interactive objects and a plurality of dynamic objects, wherein an interactive object is an object which navigates or moves by application of an external force and a dynamic object navigates or moves without the external force with a linear velocity (D) and an angular velocity (T), wherein the external force refers to a force external to the dynamic object or the interactive object;

estimating a current position of the tele-robot based on a Simultaneous localization and mapping (SLAM) technique using a velocity associated with the tele-robot, wherein the velocity of the tele-robot is obtained using the plurality of sensors and the velocity includes an angular velocity and a linear velocity;

generating a geo-centric top view map from the depth map using the current position of the tele-robot based on a spatial transform (ST) technique, wherein the depth map is converted to an ego-centric map which is a top view of the depth map and the ego-centric map is projected at the current position of the tele-robot using the ST technique to generate the geo-centric top view map, wherein the geo-centric top view map comprises the current position of the tele-robot and location details of the plurality of objects;

receiving a video feed of the dynamic environment at the tele-robot using the plurality of sensors, wherein the video feed is in RGB format;

identifying the plurality of interactive objects and the plurality of dynamic objects in the video feed based on an object detection technique;

estimating, on determining an object of the plurality of objects as being an interactive object or a dynamic object:

on determining the object is an interactive object, estimating an interactive object position of the interactive object in the geo-centric map based on a position estimation technique; and on determining the object is a dynamic object, estimating a future position of the dynamic object in the geo-centric map based on a future position estimation technique using a motion model, wherein the future position estimation technique includes the following steps:

generating an ego centric projection of the dynamic object in the geo-centric map based on a depth segmentation technique, wherein the generation of the ego centric projection of the dynamic object in the geo-centric map based on the depth segmentation technique includes segregation of a depth map of the dynamic object from the rest of the depth map obtaining a geo centric representation of the dynamic object by passing an ego-centric map in a Spatial Transform (ST) using the velocity; and estimating the future position of the dynamic object based on the geo centric representation of the dynamic object using the motion model; and determining a navigation local policy for the tele-robot by passing the geo-centric map through a Fast Marching Motion Planner (FMMP) using the goal point, the current position of the tele-robot and the interactive object position or the future dynamic object position.

\* \* \* \* \*